Nov. 20, 1962    J. A. BIRDWELL    3,065,427
PHASE SENSITIVE DETECTOR
Filed Aug. 29, 1958

INVENTOR
*James A. Birdwell*

BY *Stevens, Davis, Miller & Mosher*
ATTORNEYS

United States Patent Office 3,065,427
Patented Nov. 20, 1962

3,065,427
PHASE SENSITIVE DETECTOR
James A. Birdwell, Irving, Tex., assignor to Texas Instruments Incorporated, Dallas, Tex., a corporation of Delaware
Filed Aug. 29, 1958, Ser. No. 758,107
5 Claims. (Cl. 328—133)

This invention relates to a phase sensitive detector and more particularly to a bridge circuit for producing a direct current voltage proportional to the phase angle between two cyclically varying voltages applied to the circuit.

Bridge-type phase sensitive detectors are broadly known in the prior art but have required the use of a center-tapped transformer as exemplified in U.S. Patent No. 2,774,038 to Stavis. In these prior art circuits, a reference voltage is applied to the primary winding of a transformer whose center-tapped secondary forms a part of the bridge circuit, and a signal voltage is applied to another part of the bridge by means of a signal input transformer whose secondary carries the current flowing through the center-tapped transformer. Therefore, the principal object of this invention is to reduce the current flowing through the signal input transformer of a phase sensitive detector.

Another object is to balance out residual input currents so that only signal currents flow through the signal transformer, thereby allowing a smaller signal transformer to be used.

A further object is to prevent the input signal voltage from entering the reference voltage supply.

Still another object is to provide a phase sensitive detector to which the reference voltage may be applied directly without the necessity of an intervening center-tapped transformer as was required in the past.

An additional object of this invention is to provide a direct-current voltage which is indicative of the difference in phase angle between a reference and a signal voltage and which is also proportional to the magnitude of the signal voltage.

A still further object of this invention is to provide a phase sensitive detector with a time marking function.

In the attainment of the foregoing objects, a specific feature of this invention resides in a phase sensitive bridge detector having two resistance legs and two diode legs connected in parallel and a capacitor circuit connected therebetween. An A.C. signal voltage is applied to the capacitor circuit, and an A.C. reference voltage of the same frequency is applied across the parallel-connected resistances and diodes. A D.C. output voltage is thereby developed across said capacitor which is proportional to the difference in phase between the reference and signal voltages.

Figure 1:
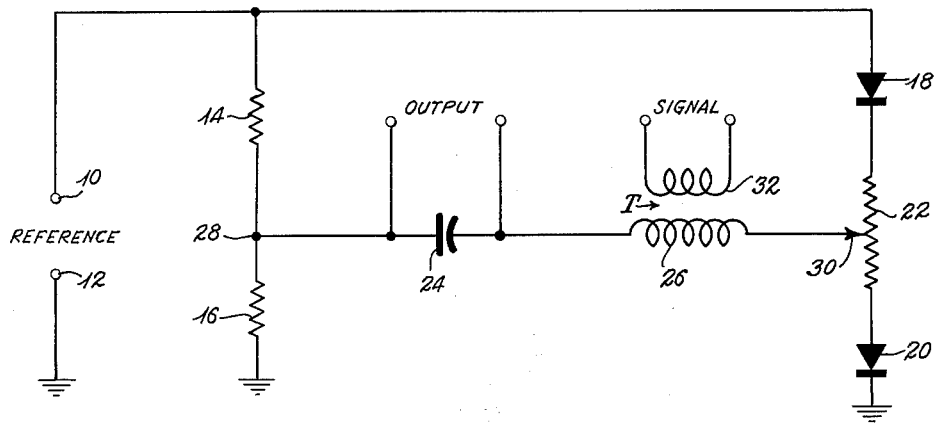
Figure 2:
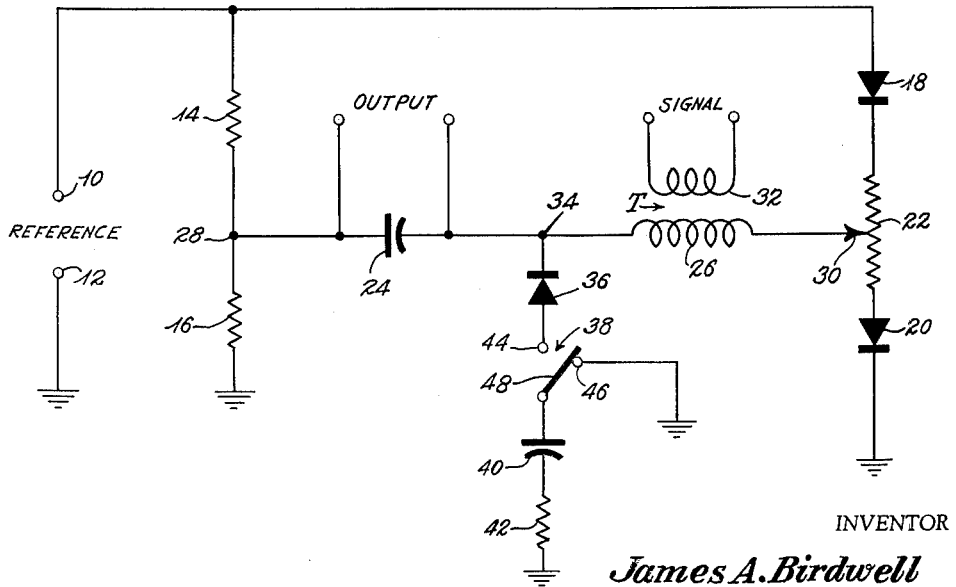

Further objects and advantages of the present invention will become apparent from the following detailed description taken in conjunction with the accompanying drawing which forms a part of this disclosure and in which:

FIG. 1 shows a circuit diagram of a phase sensitive detector embodying this invention; and FIG. 2 shows a modification of the circuit illustrated in FIG. 1 to include a time marking function.

With reference to FIG. 1, there is shown a phase sensitive detector embodying this invention and having input terminals 10 and 12, terminal 12 being grounded. Connected across these input terminals are two legs of a bridge including resistors 14 and 16 connected in series, one end of resistor 16 also being grounded. Also connected across the input terminals and in parallel with the resistance legs are two diode legs in series and including similarly poled diodes 18 and 20 and a balancing resistor 22 connected therebetween.

A third series circuit comprising capacitor 24 and transformer winding 26 is connected between the junction point 28 of resistors 14 and 16 and resistor 22. A variable tap 30 is connected between one end of winding 26 of signal input transformer T and resistor 22 so that the point of contact of tap 30 on resistor 22 may be varied to provide balancing as will be described below.

A cyclically varying reference voltage is applied between terminals 10 and 12. A signal voltage of the same frequency is applied across the primary winding 32 of signal transformer T, thereby inducing a signal voltage in winding 26 in series with capacitor 24.

Diodes 18 and 20 are controlled by the reference voltage which must be of greater amplitude than the signal voltage appearing across the secondary winding 26 of input transformer T. The signal voltage induced in winding 26 has a complete current path through which to charge capacitor 24 during the conduction half cycle of the diodes, as determined by the instantaneous polarity of the reference voltage. For example, when terminal 10 is positive with respect to terminal 12 (ground), both diodes 18 and 20 will be forward biased, and thereby conducting, so that the signal voltage appearing across winding 26 charges capacitor 24. However, when terminal 10 is negative with respect to ground, both diodes are reverse biased and thereby present a very high resistance to the signal voltage so that there is no current path through which capacitor 24 may be charged by the signal voltage induced in winding 26.

The D.C. output voltage appearing across capacitor 24 is proportional to the magnitude of the signal voltage and the cosine of the phase angle between the signal and reference voltages, or as expressed mathematically:

$$e_0 \alpha e_{in} \cos \theta$$

where
$e_0$ is the D.C. voltage appearing across capacitor 24,
$e_{in}$ is the magnitude of the voltage induced in winding 26, and
$\theta$ is the phase angle between the reference and signal voltages.

Adjusting the position of variable tap 30 on resistor 22 will balance the bridge to give zero output voltage across capacitor 24 when there is zero signal voltage input. In the event of a residual input voltage, variable tap 30 may be positioned on resistor 22 to unbalance the bridge to counteract the effect of the residual input signal and thereby indicate a zero output voltage across capacitor 24 when the residual signal is the only input.

FIG. 2 shows a modification of the phase sensitive detector shown in FIG. 1 and includes a time marking function for providing an output time marking pulse across capacitor 24 which pulse is independent of the signal input voltage appearing across winding 26. To accomplish this, a fourth series circuit is connected between the junction point 34 between capacitor 24 and winding 26 and ground. This fourth series circuit includes a diode 36 poled oppositely to diodes 18 and 20, switch 38, capacitor 40 and resistor 42.

Switch 38 has contacts 44 and 46 and also a switch arm 48. Contact 44 is connected to the anode of diode 36 and contact 46 is connected to ground. When switch 38 is closed, capacitor 40 is charged by the reference voltage through resistor 14, capacitor 24, diode 36 and resistor 42. Capacitor 40 will hold this charge until switch 38 is opened, i.e., switch arm 48 is in engagement with contact 46, to discharge capacitor 40 to ground and disconnect the timing circuit from the detector. It can be seen that, when switch 38 is closed and the reference voltage forward biases diode 36, a timing pulse is obtained across capacitor 24 during each negative half cycle of the reference voltage until capacitor 40 charges and prevents the further flow of time-marking charging current. During each positive half cycle, the timing circuit is isolated by diode 36 from the detector which functions as shown in FIG. 1.

Since diode 36 is poled oppositely to diodes 18 and 20, diode 36 will prevent the charging of capacitor 40 by the marking function charging current when diodes 18 and 20 are conducting. Therefore, no marking function charging current will pass through the winding 26, and consequently no undesirable transients will be coupled into primary winding 32.

An advantage of the circuit shown in FIG. 2, therefore, is that this circuit arrangement allows timing information to be included in the output voltage while at the same time isolating the time marking output pulses from the signal input transformer T and preceding circuits.

A phase sensitive detector embodying this invention requires no center-tapped transformer for the reference voltage. Since residual input currents are balanced out, only signal current flows through the signal transformer, thus allowing the use of a smaller signal transformer. The working load is the only shunt across the output capacitor 24, the load and capacitor providing all the filtering action. In addition, with a given load across capacitor 24, the value of the capacitor may be chosen such that peak detection is approached.

While there has been illustrated and described a practical and efficient phase sensitive detector embodying this invention, it will be understood that modifications, alterations and substitutions may be made therein without departing from the true spirit and scope of the invention as defined in the appended claims.

What is claimed is:

1. A phase sensitive detector for providing an output signal which is a function of the phase angle between first and second signals which comprises first and second resistance legs connected in parallel with third and fourth diode legs, the diodes being poled in the same direction, a capacitor connected between the juncture of said resistance legs and the juncture of said diode legs, means connected in parallel with said legs for applying a reference signal to said bridge, transformer means for inducing said second signal in series with said capacitor to obtain said output voltage across said capacitor, and a timing circuit connected to said capacitor for producing a time marking pulse across said capacitor when said diodes are non-conducting so that said capacitor performs dually to provide said signal that is a function of said phase angle and also to provide said time marking pulse.

2. A phase sensitive detector as defined in claim 1 wherein said timing circuit includes a third diode poled in the opposite direction from said first two diodes.

3. A phase sensitive detector as defined in claim 2 further comprising a capacitor and switch means both connected in series with said third diode.

4. In a bridge circuit having a first pair of input terminals, a second pair of input terminals, a pair of output terminals, a first pair of serially-connected elements, a second pair of serially-connected elements and means connecting said pairs of serially-connected elements in parallel; means including a reactance element interconnecting the junction of said first pair of elements with the junction of said second pair of elements, means for applying alternating current signals to said first and second pairs of input terminals, and means including said reactance element effective during alternate half cycles of one of said alternating current signals for developing marking pulses upon said output terminals and effective during the remaining half cycles for developing upon said output terminals direct current signals representing the phase difference between said alternating current signals.

5. A phase sensitive detector for providing an output signal which is a function of the phase angle between first and second signals comprising a bridge circuit having four legs, the first and second legs each including a linear impedance and being connected to form a first series circuit, the third and fourth legs each including a unidirectional current conducting device and being connected to form a second series circuit, said first and second series circuits being connected in parallel with each other to form said bridge, a capacitor circuit including a capacitor connected between said series circuits, means for applying said first signal across said bridge, means to apply said second signal to said capacitor circuit to develop said output signal across said capacitor, a timing circuit connected to said capacitor circuit for causing said capacitor to act in dual capacity to further provide a time marking pulse derived from said first signal independently of said second signal so that capacitor serves the dual purposes of providing said signal that is a function of said phase angle and also providing said time marking pulse.

References Cited in the file of this patent

UNITED STATES PATENTS

| | | |
|---|---|---|
| 1,929,216 | Pfannenmuller | Oct. 3, 1933 |
| 2,446,188 | Miller | Aug. 3, 1948 |
| 2,594,428 | Hall | Apr. 29, 1952 |
| 2,628,279 | Roe | Feb. 10, 1953 |
| 2,634,393 | Wu | Apr. 7, 1953 |
| 2,640,939 | Staschover et al. | June 2, 1953 |
| 2,774,932 | Patton | Dec. 18, 1956 |
| 2,782,994 | Dotson | Feb. 26, 1957 |
| 2,790,898 | Bady | Apr. 30, 1957 |
| 2,829,251 | Patton | Apr. 1, 1958 |
| 2,919,404 | Rock | Dec. 29, 1959 |
| 2,923,884 | Moss | Feb. 2, 1960 |
| 2,930,892 | Palmer | Mar. 29, 1960 |

FOREIGN PATENTS

| | | |
|---|---|---|
| 888,133 | Germany | Aug. 31, 1953 |

OTHER REFERENCES

Waveforms, text book, by Chance et al., vol. 19, Radiation Laboratory Series, published by McGraw-Hill; copyright 1949; page 400.

"Phase-Selective Detectors," article in Electronics, February 1954; pages 188—192.